United States Patent [19]

Brown

[11] 4,043,354
[45] Aug. 23, 1977

[54] DRAIN TRAP AND COVER CONSTRUCTION
[75] Inventor: Douglas S. Brown, Vassar, Mich.
[73] Assignee: D & J Tool & Die, Inc., Vassar, Mich.
[21] Appl. No.: 687,364
[22] Filed: May 17, 1976
[51] Int. Cl.² .................................................. F16K 9/00
[52] U.S. Cl. ........................... 137/247.33; 16/DIG. 13
[58] Field of Search ........................ 137/247.33, 247.35, 137/247.37, 247.39, 527–527.8, 247.11; 251/368; 16/DIG. 13, 171

[56] References Cited

U.S. PATENT DOCUMENTS

| | | | |
|---|---|---|---|
| 748,936 | 1/1904 | Edelen | 137/247.35 X |
| 1,469,790 | 10/1923 | Hysko | 137/247.33 X |
| 2,797,840 | 7/1957 | Gibbs | 16/171 X |
| 3,156,756 | 11/1964 | Seaver | 16/171 X |
| 3,829,061 | 8/1974 | Dayne et al. | 251/368 X |
| 3,933,173 | 1/1976 | Kajita | 137/527.8 |

Primary Examiner—William R. Cline
Attorney, Agent, or Firm—Learman & McCulloch

[57] ABSTRACT

A drain trap and cover assembly adapted for installation at the upper end of a vertical drain pipe passing through the concrete floor comprises a cup-shaped bowl having a flange at its upper end to which is pivoted a cover swingable between bowl-closing and bowl-opening positions. The pivotal connection comprises a pivot pin carried by the cover and rotatably accommodated in a socket formed in the flange. The socket has a throat which opens into the socket, the size of the throat being slightly less than the diameter of the pivot pin. The material from which the flange is made is sufficiently resilient to enable the throat opening to be enlarged and allow passage from the pivot pin into the socket, following which the throat opening reassumes its normal size to capture the pivot pin within the socket.

4 Claims, 3 Drawing Figures

DRAIN TRAP AND COVER CONSTRUCTION

The invention disclosed herein ralates to drain traps of the kind normally installed at the upper ends of drain pipes that extend through concrete floors of basements, garages, and the like. Conventionally, such drain traps are formed of metal and are provided with apertured metal covers. In time, the metal inevitably rusts, thereby resulting in an unsightly appearance and a structurally weakened assembly. The use of such metallic members also results in other disadvantages. For example, metallic traps and covers are heavy as compared to lighter, non-metallic materials, thereby necessitating heavier and more expensive manufacturing machinery. In addition, heavy metallic members result in higher shipping costs than would be encountered if non-metallic, lighter members could be used. Further, metal traps and covers are likely to break if dropped onto a hard surface, thereby resulting in losses.

An object of this invention is to provide a drain trap and cover assembly formed of material which is lighter than metals heretofore used for such an assembly, but which nevertheless is as strong as many metals and is breakage resistant.

Another object of the invention is to provide an assembly of the kind referred to wherein the cover and trap may be preassembled for shipment and installation as a unit.

Another object of the invention is to provide a molded assembly of the kind referred to which requires virtually no finishing following molding and which, when installed, presents an attractive appearance.

Other objects and advantages of the invention will be pointed out specifically or will become apparent from the following description when it is considered in conjunction with the appended claims and the accompanying drawings, in which:

Figure 1:
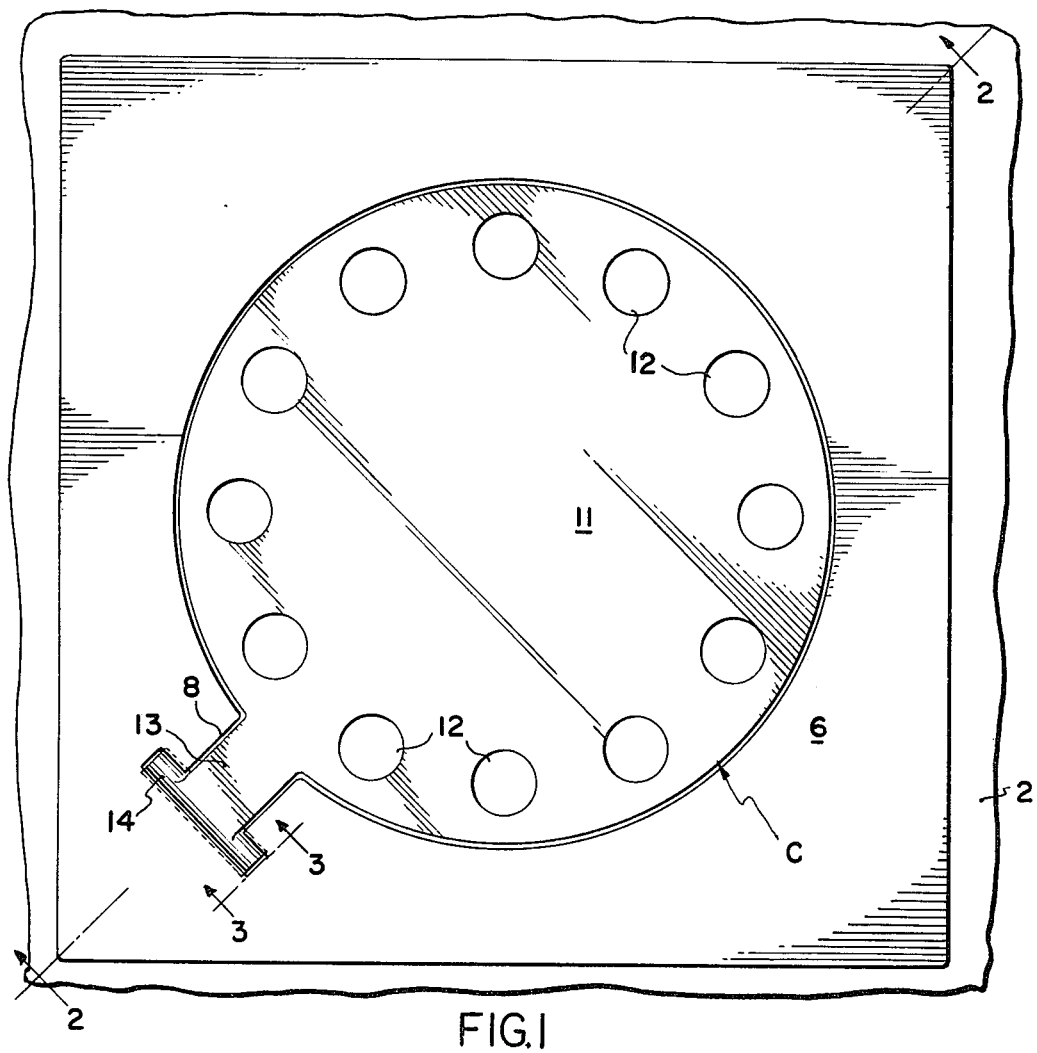
FIG. 1 is a plan view illustrating the trap and cover assembly installed in a concrete floor.

A trap and cover assembly according to the invention is adapted to be installed at the upper end of a vertical, cylindrical drain pipe 1 which extends through an opening formed in a concrete or the like floor 2 such as commonly is found in basements, garages, factories, and the like to enable water on the floor to be drained.

The trap and cover assembly comprises a trap T in the form of an open top, cup-shaped bowl 3 having at its center a tubular conduit 4 which forms a central opening 5 through the bowl. From the conduit 4 the bowl 3 extends upwardly and has a maximum outside diameter corresponding substantially to the inside diameter of the pipe 1 so as to enable the bowl to nest within the pipe. At its upper edge, however, the bowl is provided with a laterally extending marginal flange 6 which overlies and seats upon the upper edge of the pipe 1.

The flange 6 preferably extends well beyond the periphery of the bowl 3 to provide a stable mount for the bowl to prevent its collapsing inwardly of the pipe 1 even though substantial force is concentrated on the bowl inwardly on the flange 6. In a preferred installation, the floor 2 has a recess 7 surrounding the pipe 1 of a depth corresponding to the thickness of the flange 6, thereby providing a flush seating of the flange 7 in the floor 2.

To one side of the bowl 3 the flange 6 is provided with a radially extending channel 8 which terminates in a socket 9 that extends athwart and beyond both edges of the channel. A major portion of the socket 9 is formed on the radius of a circle, but the confronting sides of the socket adjacent the upper end of the latter are vertical, thereby defining between the sides 10 a throat opening into the socket. The distance between confronting sides 10 is less than the diameter of the circle on which the socket 9 is formed.

The assembly includes a cover C comprising a disc 11 having a diameter corresponding substantially to the maximum outside diameter of the bowl 3 and provided with a plurality of drain openings 12 adjacent its peripheral edge. Extending radially from the cover disc is a tongue 13 of such width as to be accommodated in the channel 8 and having a thickness corresponding substantially to the depth of the channel 8. At the radially outer end of the tongue 13 is a cylindrical pivot pin having a length corresponding to the length of the socket 9 and having a diameter corresponding to the diameter on which the socket is formed. Thus, the diameter of pin 14 is greater than the distance between the confronting sides 10 of the socket 9.

On the under surface of the cover disc 11 is an annular member 15 which occupies a position radially inwardly of the openings 12 and is of such diameter as to receive the upper end of the tubular conduit 4 with an annular space or passage 16 therebetween.

The parts of the assembly preferably are molded from a non-metallic, plastics material having some inherent resilience and considerable strength. Nylon is a suitable material from which the parts may be molded. Members molded from nylon may have different colors and normally no finishing of the molded parts is required other than the elimination of flash.

In the manufacture of the assembly, the cover and the trap are molded separately. The cover may be assembled with the trap by forcing the pin 14 into the socket 9. Nylon has sufficient resilience to enable the confronting sides 10 of the socket to be spread apart an amount sufficient to permit passage of the pin into the socket, and the resilience of nylon will cause the sides of the socket to recover to their original positions and thereby latch the pin in the socket. Considerably less resistance to passage of the pin 14 into the socket 9 will be encountered if the pin is forced into the socket shortly after the trap is removed from its mold inasmuch as the material from which the trap is made still will be warm.

To enable the cover disc 11 to be flush with the upper surface of the flange 6, the latter is notched as at 17 to provide a shoulder on which the marginal edge of the cover disc may seat. The depth of the shoulder-forming notch corresponds substantially to the thickness of the cover 11. Care should be taken that the drain openings 12 are located radially inwardly of the shoulder 17 and radially outwardly of the conduit 4 so as to assure drainage of water into the interior of the bowl 3.

Figure 2:
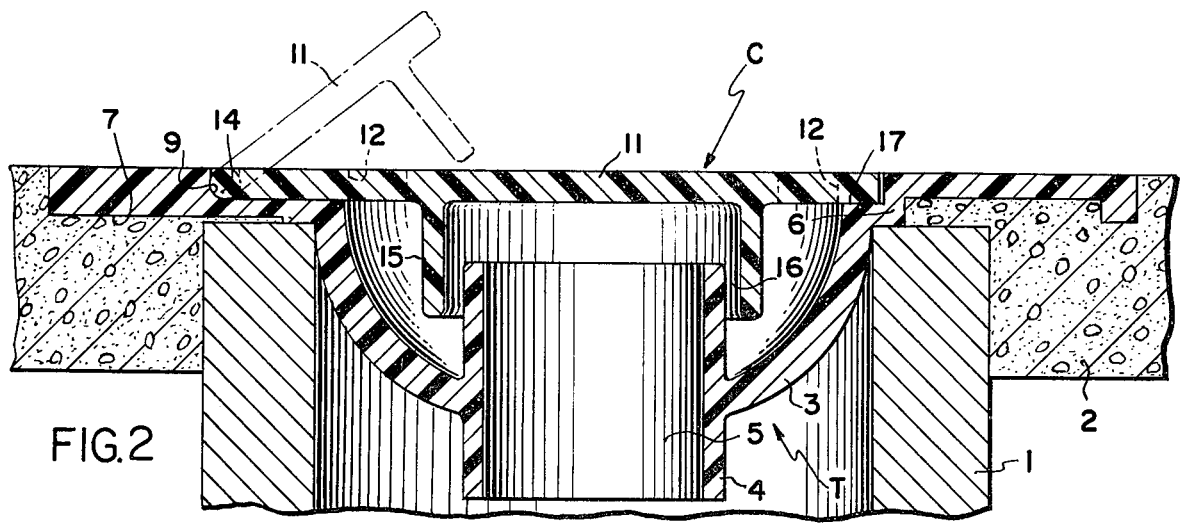
FIG. 2 is a sectional view taken on the line 2—2 of FIG. 1.
Figure 3:
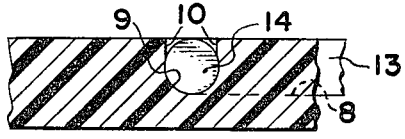
FIG. 3 is an enlarged sectional view taken on the line 3—3 of FIG. 1.

When the parts are assembled and installed in the manner indicated in FIG. 2, the conduit 4 projects into the annular member 15, but terminates short of the cover 11, thereby providing a passage through which water that accumulates in the bowl may enter the conduit 4 and be discharged through the drain pipe 1.

If at any time access to the interior of the bowl is required, the cover 11 may be pivoted about the pivot pin 14 to an elevated position as is indicated in dotted lines in FIG. 2.

The disclosed embodiment is representative of a presently preferred form of the invention, but is intended to be illustrative rather than definitive thereof. The invention is defined in the claims.

I claim:

1. A drain trap and cover construction comprising an open top bowl having a central passage therein; a marginal flange formed of non-metallic material extending outwardly from the upper edge of said bowl, said flange having a substantially cylindrical socket formed therein with a throat opening leading thereinto from the upper surface of said flange, said throat opening having a length corresponding to that of said socket and having a normal width less than the diameter of said socket, said flange having a channel in its upper surface extending from said socket to the upper edge of said bowl, said channel having a width less than the length of said socket and said socket extending at both ends thereof beyond said channel; a non-metallic cover for said bowl; and an integral tongue extending from said cover and terminating in a substantially cylindrical pivot pin rotatably accommodated in said socket, said tongue having a length, width and thickness corresponding substantially to the length, width and depth of said channel and said pivot pin having a length and diameter corresponding to the length and diameter of said socket but having a diameter greater than the width of said throat opening, the material from which said flange is formed having sufficient resilience to enable said pivot pin to enlarge the width of said throat opening to permit passage of said pivot pin into said socket, following which said throat opening returns to its normal width to retain said pin in said socket, the upper surfaces of said flange, said cover, said tongue, said pivot pin being substantially flush when said cover is in its bowl-closing position.

2. The construction according to claim 1 wherein said flange is notched adjacent the upper end of said bowl to form a shoulder on which said cover may rest in its bowl-closing position, said notch having a depth corresponding to the thickness of said cover so that said cover and said flange are flush in said bowl-closing position of said cover.

3. The construction according to claim 1 wherein said bowl and said cover are formed of nylon.

4. The construction according to claim 1 wherein said cover has openings therethrough adjacent its periphery in communication with the interior of said bowl.

* * * * *